Patented Apr. 23, 1929.

1,710,424

UNITED STATES PATENT OFFICE.

OSKAR LOEHR, OF UERDINGEN-ON-THE-RHINE, GERMANY, ASSIGNOR TO I. G. FARBEN-INDUSTRIE AKTIENGESELLSCHAFT, OF FRANKFORT-ON-THE-MAIN, GERMANY.

PRODUCTION OF POLYALKYLENE GLYCOL ESTERS.

No Drawing. Application filed December 16, 1926, Serial No. 155,341, and in Germany December 18, 1925.

The invention relates to the production of polyalkylene glycol derivatives corresponding to the formula $R.(OCH_2.CH_2)_nOR'$ wherein R and R' are hydrogen atoms or acyl groups and $n$ is equal to or greater than 2; and it comprises an improved process of obtaining such compounds from olefine oxides and hydroxylcompounds. More especially the invention relates to the production of esters of polyalkylene glycols by reacting upon an organic carboxylic acid with an olefine oxide in excess.

According to the present invention the new process is based on the observation that the formation of polyalkylene glycol derivatives by addition of more than one molecule of olefine oxide to one molecule of a carboxylic acid may be very easily effected with the aid of certain catalysts. By varying the carboxylic acid the most different esters may be produced. The chemical and physical properties of the resulting products depend substantially upon the number of molecules of olefine oxide reacting upon one molecule of organic carboxylic acid; thus viscosity and solubility in water are increased by a growing ratio of olefine oxide to carboxylic acid.

The catalysts producing a combination of olefine oxides with carboxylic acids are of different kind. The process may be carried out by admixing to an organic carboxylic acid little amounts of strong mineral acids e. g. sulfuric acid, phosphoric acid or of acid reacting salts e. g. sodium bisulfate and passing the vapours of an olefine oxide into the mixture. Neutral salts such as the alkali metal salts of organic acids, too, may serve as catalysts.

It depends upon the nature of the catalysts and temperatures used whether compounds containing one or two acid radicals or mixtures of both are obtained. In all cases, even using precise molecular ratios of olefine oxide to organic carboxylic acid, no homogeneous compounds of a definite number of carbon atoms but mixtures of the esters of different polyalkylene glycols are formed. Thus by reacting upon one molecular weight of acetic acid with three molecular weights of ethylene oxide, besides triethylene glycol acetate, the acetates of diethylene glycol, tetraethylene glycol etc. are produced. The several compounds may be separated by fractionated distillation, suitably in vacuo; but in most cases this is not necessary for technical use of the products.

A preferred application of the invention, to which the process is in no way restricted, consists in mixing 25 parts of sulfuric acid with 420 parts of acetic acid and treating the mixture with 660 parts of ethylene oxide, temperature rising to 125° C. The sulfuric acid is then neutralized with the calculated amount of calcium carbonate and the liquid distilled suitably under reduced pressure. Under 20 mm. the minor part distils over between 90 and 120° being glycol diacetate; the higher boiling parts consist of the acetates of poly ethylene glycols.

The mode of working is similar, if instead of acetic acid other carboxylic acids are used, e. g. formic acid, butyric acid, crotonic acid, maleic acid or benzoic acid.

I claim:

1. An improved process of making esters of polyalkylene glycols which consists in reacting upon an organic carboxylic acid with an olefine oxide in excess in the presence of an esterification catalyst.

2. An improved process of making esters of polyalkylene glycols which consists in reacting upon an organic carboxylic acid with an olefine oxide in excess in the presence of a strongly acid reacting inorganic substance as catalyst.

3. An improved process of making esters of polyalkylene glycols which consists in reacting upon an organic carboxylic acid with an olefine oxide in excess in the presence of sulfuric acid.

4. An improved process of making acetates of polyalkylene glycols which consists in reacting upon acetic acid with an olefine oxide in excess in the presence of sulfuric acid.

5. An improved process of making acetates of polyethylene glycols which consists in reacting upon acetic acid with ethylene oxide in excess in the presence of sulfuric acid.

In testimony whereof I have hereunto set my hand.

OSKAR LOEHR.